US009332153B2

(12) United States Patent
Tanaka

(10) Patent No.: US 9,332,153 B2
(45) Date of Patent: May 3, 2016

(54) IMAGE READING DEVICE, IMAGE FORMING APPARATUS, AND IMAGE PROCESSING METHOD

(71) Applicant: KYOCERA Document Solutions Inc., Osaka-shi, Osaka (JP)

(72) Inventor: Kei Tanaka, Osaka (JP)

(73) Assignee: KYOCERA Document Solutions Inc., Osaka-shi (JP)

( * ) Notice: Subject to any disclaimer, the term of this patent is extended or adjusted under 35 U.S.C. 154(b) by 0 days.

(21) Appl. No.: 14/629,354

(22) Filed: Feb. 23, 2015

(65) Prior Publication Data
US 2015/0244893 A1 Aug. 27, 2015

(30) Foreign Application Priority Data

Feb. 25, 2014 (JP) ................................. 2014-033592

(51) Int. Cl.
*H04N 1/04* (2006.01)
*H04N 1/40* (2006.01)

(52) U.S. Cl.
CPC ............. *H04N 1/40* (2013.01); *H04N 1/40056* (2013.01)

(58) Field of Classification Search
CPC .................................. H04N 1/047; H04N 1/40
USPC ......... 358/461, 496, 498, 406, 504, 505, 474, 358/403, 444; 382/274, 275
See application file for complete search history.

(56) References Cited

U.S. PATENT DOCUMENTS

| 4,907,097 | A  | * | 3/1990  | Sobue ..................... H04N 1/401 358/461 |
| 5,371,613 | A  | * | 12/1994 | Arimoto ................. H04N 1/401 358/461 |
| 5,802,217 | A  | * | 9/1998  | Suzuki ............... H04N 1/40006 358/461 |
| 5,864,408 | A  | * | 1/1999  | Kumashiro ............ H04N 1/401 358/461 |
| 7,327,497 | B2 | * | 2/2008  | Sugeta .................. H04N 1/4076 358/406 |
| 7,352,496 | B2 | * | 4/2008  | Han ....................... H04N 1/401 348/241 |
| 7,525,692 | B2 | * | 4/2009  | Nakaya ................ H04N 1/4076 358/461 |
| 8,717,636 | B2 | * | 5/2014  | Lee ..................... H04N 1/00013 358/406 |

FOREIGN PATENT DOCUMENTS

JP 2008187529 A 8/2008

* cited by examiner

*Primary Examiner* — Cheukfan Lee
(74) *Attorney, Agent, or Firm* — Alleman Hall McCoy Russell & Tuttle LLP

(57) ABSTRACT

In an image reading device, a reading control portion reads image data for one line in a main scanning direction from a first reference member having a reference color. A storage portion stores initial reference data for one line generated based on image data for a plurality of lines read from a second reference member by using an image reading portion while a surface of the second reference member having the reference color is moving in a sub scanning direction perpendicular to the main scanning direction. A reference data generation portion generates reference data based on the image data read by the reading control portion and a high-frequency component of the initial reference data stored in the storage portion. A shading correction portion performs shading correction for image data read from a document by the image reading portion, based on the reference data generated by the reference data generation portion.

10 Claims, 8 Drawing Sheets

IMAGE READING DEVICE, IMAGE FORMING APPARATUS, AND IMAGE PROCESSING METHOD

INCORPORATION BY REFERENCE

This application is based upon and claims the benefit of priority from the corresponding Japanese Patent Application No. 2014-033592 filed on Feb. 25, 2014, the entire contents of which are incorporated herein by reference.

BACKGROUND

The present disclosure relates to an image reading device, an image forming apparatus, and an image processing method capable of executing shading correction processing for read image data.

In an image reading device such as a scanner, an image reading portion having a light source and a photoelectric conversion element may be placed being fixed with respect to a reading position for image data. An image reading device of this type performs shading correction for correcting variation in light emission characteristics of a light source or in light reception sensitivities of photoelectric conversion elements based on reference data read from a reference member placed being opposed to the image reading portion.

If a foreign material such as dust adheres to the reference member, in reference data read from the reference material, the density of a pixel corresponding to the adhesion position of the foreign material increases. Therefore, a white vertical line may occur in image data obtained through execution of shading correction, whereby the image quality of read image data may be reduced. In this regard, there is known an image reading device capable of eliminating an influence of a foreign material adhering to a reference member by superimposing a high-frequency component contained in initial reference data read from the reference member at a stage of shipment of the image reading device, onto a low-frequency component contained in reference data read from the reference member before reading of a document.

SUMMARY

An image reading device according to one aspect of the present disclosure includes an image reading portion, a reading control portion, a storage portion, a reference data generation portion, and a shading correction portion. The image reading portion is configured to read image data from a document conveyed to pass through a predetermined reading position. The reading control portion is configured to read the image data for one line in a main scanning direction from a first reference member placed being opposed to the image reading portion and having a predetermined reference color. The storage portion is configured to store initial reference data for one line generated based on the image data for a plurality of lines read from a second reference member by using the image reading portion while a surface of the second reference member having the reference color is moving in a sub scanning direction perpendicular to the main scanning direction at a position opposed to the image reading portion. The reference data generation portion is configured to generate reference data based on the image data read by the reading control portion and a high-frequency component of the initial reference data stored in the storage portion. The shading correction portion is configured to perform shading correction for the image data read from the document by the image reading portion, based on the reference data generated by the reference data generation portion.

An image forming apparatus according to another aspect of the present disclosure includes the image reading device and an image forming portion configured to form an image based on image data read by the image reading device.

An image processing method according to another aspect of the present disclosure is executed by an image reading device that includes an image reading portion configured to read image data from a document conveyed to pass through a predetermined reading position. The image processing method includes the following first to fourth steps. In the first step, initial reference data for one line is stored in a storage portion, the initial reference data for one line being generated based on the image data for a plurality of lines read from a second reference member by using the image reading portion while a surface of the second reference member having a predetermined reference color is moving in a sub scanning direction perpendicular to a main scanning direction at a position opposed to the image reading portion. In the second step, the image data for one line in the main scanning direction is read from a first reference member placed being opposed to the image reading portion and having the reference color. In the third step, reference data is generated based on the image data read in the second step and a high-frequency component of the initial reference data stored in the storage portion in the first step. In the fourth step, shading correction is performed for the image data read from the document by the image reading portion, based on the reference data generated in the third step.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Hereinafter, with reference to the accompanying drawings, embodiments of the present disclosure will be described for understanding of the present disclosure. The following embodiments are examples in which the present disclosure is embodied, and are not intended to limit the technical scope of the present disclosure.

[Schematic Configuration of Image Forming Apparatus 10]

Figure 1:
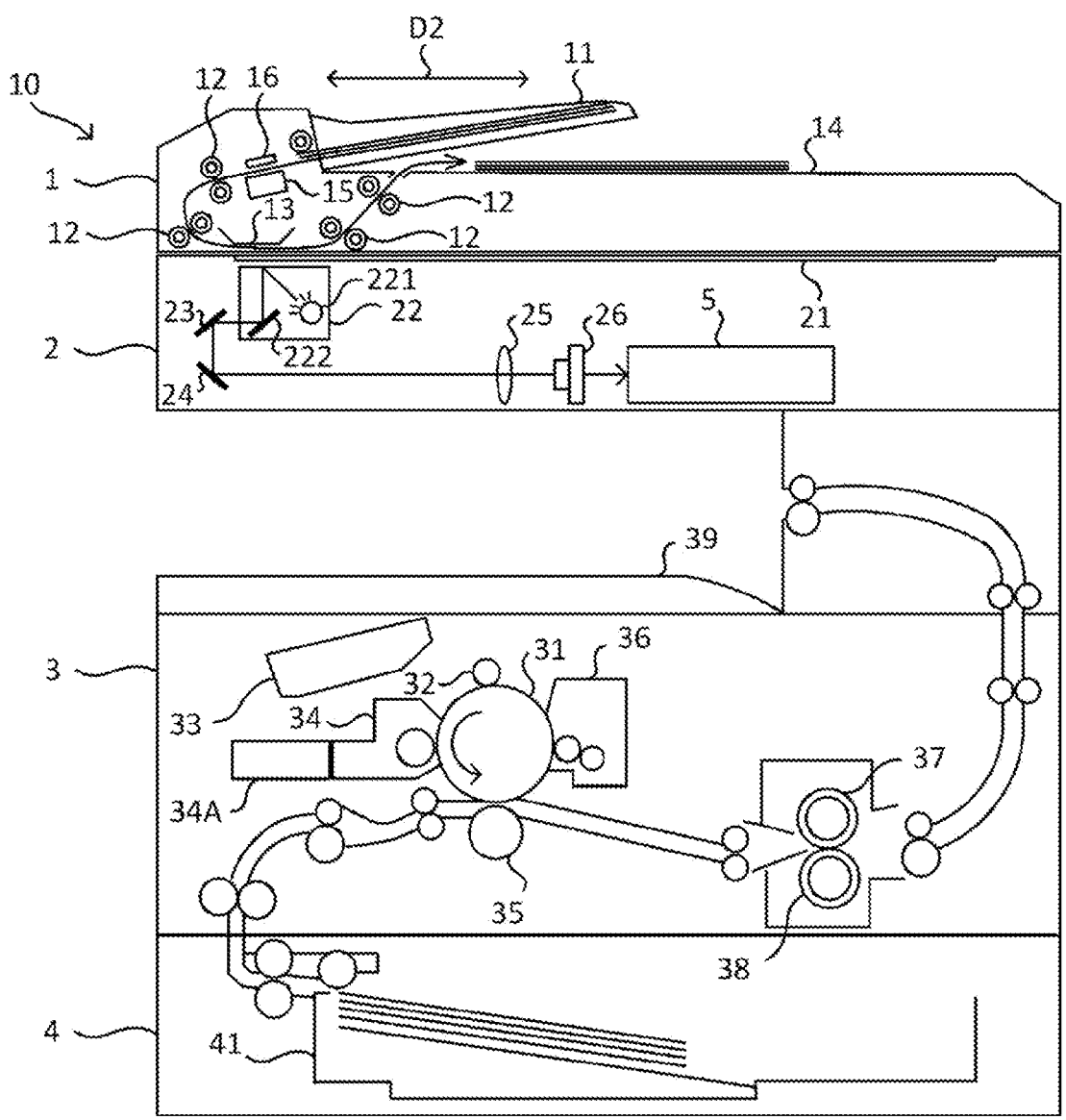
FIG. 1 is a diagram showing the configuration of an image forming apparatus according to an embodiment of the present disclosure.

First, with reference to FIG. 1 and FIG. 2, the schematic configuration of an image forming apparatus 10 according to an embodiment of the present disclosure will be described. Here, FIG. 1 is a schematic sectional view of the image forming apparatus 10. In the following description, a main scanning direction D1 and a sub scanning direction D2 shown in FIG. 1 and FIG. 4 may be used.

Figure 2:
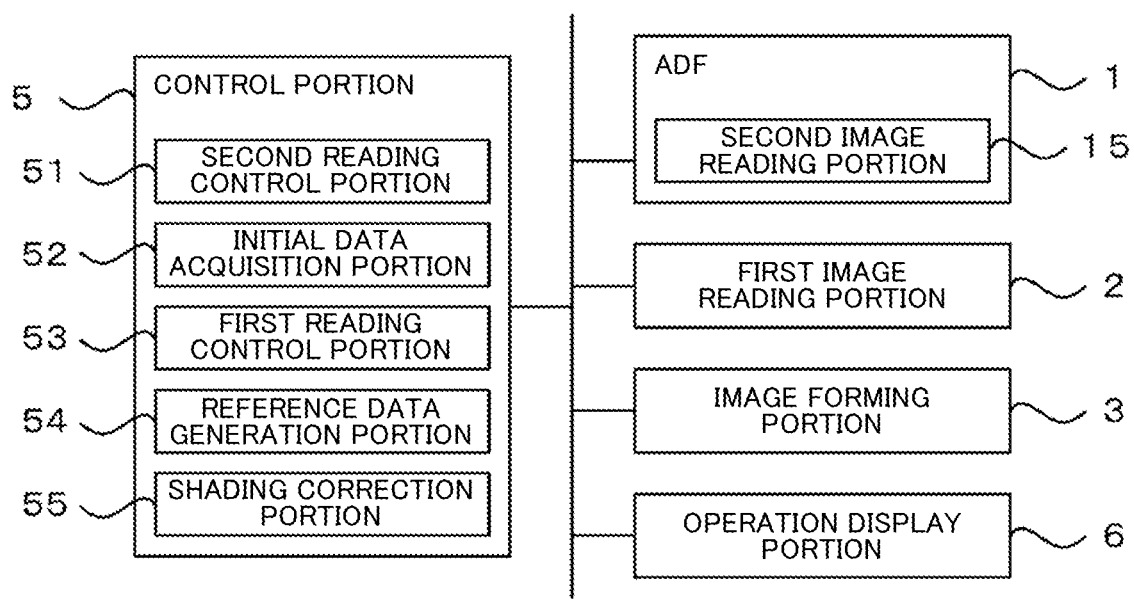
FIG. 2 is a block diagram showing the system configuration of the image forming apparatus according to the embodiment of the present disclosure.

As shown in FIG. 1 and FIG. 2, the image forming apparatus 10 includes an ADF 1, a first image reading portion 2, an image forming portion 3, a sheet feed portion 4, a control portion 5, an operation display portion 6, and the like. The image forming apparatus 10 is a multifunction peripheral having, in addition to a scan function of reading image data from a document, a plurality of functions such as a printer function, a facsimile function, or a copy function. Here, a device including the ADF 1 and the control portion 5 is an example of the image reading device of the present disclosure. The present disclosure is also applicable to an image reading device or an image forming apparatus such as a scanner, a facsimile device, or a copy machine.

The image forming portion 3 is an image forming portion of electrophotographic type capable of executing image forming processing (print processing) to form an image based on image data read by a second image reading portion 15 of the ADF 1 or the first image reading portion 2. The image forming portion 3 is also capable of executing the image forming processing based on image data inputted from an information processing device such as an external personal computer.

Specifically, as shown in FIG. 1, the image forming portion 3 includes a photosensitive drum 31, a charging device 32, a laser scanning unit (LSU) 33, a developing device 34, a transfer roller 35, a cleaning device 36, a fixing roller 37, a pressure roller 38, and a sheet discharge tray 39. In the image forming portion 3, an image is formed on a sheet fed from a sheet feed cassette 41 attachable to the sheet feed portion 4, through the following procedure, and the sheet having an image formed thereon is discharged to the sheet discharge tray 39. The sheet is a sheet material such as paper, coated paper, a postcard, an envelope, or an OHP sheet.

First, the photosensitive drum 31 is uniformly charged at predetermined potential by the charging device 32. Next, light based on image data is radiated to a surface of the photosensitive drum 31 by the laser scanning unit 33. Thus, an electrostatic latent image corresponding to the image data is formed on the surface of the photosensitive drum 31. Then, the electrostatic latent image on the photosensitive drum 31 is developed (visualized) as a toner image by the developing device 34. It is noted that toner (developer) is supplied to the developing device 34 from a toner container 34A attachable to the image forming portion 3. Subsequently, the toner image formed on the photosensitive drum 31 is transferred onto a sheet by the transfer roller 35. Thereafter, the toner image transferred on the sheet is heated by the fixing roller 37 to be melted and fixed, when the sheet passes between the fixing roller 37 and the pressure roller 38. It is noted that the residual toner on the surface of the photosensitive drum 31 is removed by the cleaning device 36.

The control portion 5 includes control devices such as a CPU, a ROM, a RAM, and an EEPROM (registered trademark), which are not shown. The CPU is a processor that executes various operational processes. The ROM is a nonvolatile storage portion in which information such as a control program for causing the CPU to execute various processes is stored in advance. The RAM is a volatile storage portion, and the EEPROM is a nonvolatile storage portion. The RAM and the EEPROM are used as temporary storage memories (working areas) for various processes executed by the CPU. The control portion 5 performs overall control for the image forming apparatus 10 by causing the CPU to execute various control programs stored in advance in the ROM. The control portion 5 may be formed as an electronic circuit such as an integrated circuit (ASIC), or may be a control portion separately provided from a main control portion for performing overall control for the image forming apparatus 10.

The operation display portion 6 has a display portion such as a liquid crystal panel which displays various information in accordance with a control instruction from the control portion 5, and an operation portion such as an operation key or a touch panel for inputting various information to the control portion 5 in accordance with a user's operation.

As shown in FIG. 1, the first image reading portion 2 includes a document table 21, a reading unit 22, a mirror 23, a mirror 24, an optical lens 25, and a CCD (Charge Coupled Device) 26. The document table 21 is a document placement portion provided on an upper surface of the first image reading portion 2. The reading unit 22 is movable in the sub scanning direction D2 perpendicular to the main scanning direction D1 (see FIG. 4). The reading unit 22 includes an LED light source 221 and a mirror 222.

The LED light source 221 includes multiple white LEDs arrayed along the main scanning direction D1. The mirror 222 reflects, toward the mirror 23, light reflected by a surface of a document present at a reading position on the document table 21 after radiated from the LED light source 221. Then, the light reflected by the mirror 222 is guided into the optical lens 25 by the mirror 23 and the mirror 24. The optical lens 25 converges the entering light into the CCD 26. The CCD 26 has: a photoelectric conversion element which inputs an electric signal corresponding to a reception amount of light entering from the optical lens 25, as image data of the document, to the control portion 5; and the like.

As shown in FIG. 1, the ADF 1 includes a document set portion 11, a plurality of conveyance rollers 12, a document presser 13, a sheet discharge portion 14, a second image reading portion 15, a first reference member 16, and the like.

The document set portion 11 is a document placement table on which a document to be read by one or both of the first image reading portion 2 and the second image reading portion 15 is placed. In the ADF 1, a document placed on the document set portion 11 is conveyed to the sheet discharge portion 14 by each conveyance roller 12 driven by driving means (not shown) such as a motor. Here, when the document conveyed in the ADF 1 passes through the reading position at which image data is read by the first image reading portion 2, one surface (hereinafter, referred to as a front surface) of the document is pressed onto the document table 21 by the document presser 13. Thus, the first image reading portion 2 can read image data from the front surface of the document conveyed in the ADF 1.

An image of the other surface (hereinafter, referred to as a back surface) of a document conveyed in the ADF 1 is read by the second image reading portion 15. That is, the image forming apparatus 10 can read images of the front and back surfaces of a document conveyed in the ADF 1 at the same time by using the first image reading portion 2 and the second image reading portion 15.

Specifically, the second image reading portion 15 is fixed and placed on a conveyance path of a document conveyed in the ADF 1. For example, the second image reading portion 15 is a CIS (Contact Image Sensor) having a light source such as a plurality of LEDs capable of radiating one line of light along the main scanning direction D1 for each color of R (red), G (green), and B (blue), and a plurality of photoelectric conversion elements arranged in the main scanning direction D1.

The second image reading portion 15 sequentially radiates each color light from the light source to a predetermined position on the conveyance path of a document, and converts reflection light reflected from the back surface of the conveyed document into an electric signal by each photoelectric conversion element, thereby reading color image data from the back surface of the document. Here, image data read by the second image reading portion 15 is inputted to the control portion 5. Thereafter, the control portion 5 executes various image processes such as known shading correction for the image data. Here, the second image reading portion 15 is an example of the image reading portion of the present disclosure.

The first reference member 16 is used for acquiring reference data for the shading correction to be executed for image data read by the second image reading portion 15. Here, the shading correction is image processing of correcting variation in light emission characteristics of the light source or in light reception sensitivities of the photoelectric conversion elements of the second image reading portion 15, based on predetermined reference data. Specifically, the first reference member 16 is placed such that a surface thereof having a predetermined reference color is opposed to the second image reading portion 15. For example, the first reference member 16 is a plate-like member having a white surface. In the image forming apparatus 10, image data is read from the first reference member 16 by the second image reading portion 15, whereby the reference data is generated.

If a foreign material such as dust adheres to a reference member such as the first reference member 16, in reference data read from the reference member, the density of a pixel corresponding to the adhesion position of the foreign material increases. Therefore, a white vertical line may occur in image data obtained through execution of shading correction, whereby the image quality of read image data may be reduced. In this regard, there is known an image reading device capable of eliminating an influence of a foreign material adhering to a reference member by superimposing a high-frequency component contained in initial reference data read from the reference member at a stage of shipment of the image reading device, onto a low-frequency component contained in reference data read from the reference member before reading of a document.

In the above relevant art, it can be assumed that a foreign material has already adhered to the reference member at the point when the initial reference data is acquired. In addition, if a concave or convex part exists on the surface of the reference material, shade is formed by the concave or convex part and the density of an image corresponding to the position where the concave or convex part exists increases, whereby the same problem as in the case where a foreign material adheres arises. In this regard, there is known a method of averaging image data for a plurality of lines in the main scanning direction read from a reference member and using the image data as initial reference data, thereby reducing an influence of a concave or convex part of the surface of the reference member or a foreign material adhering to the surface of the reference member. For example, a roller-like reference member is rotatably placed being opposed to an image reading portion, whereby image data for a plurality of lines are read from the reference member.

However, in the case where a roller-like reference member is rotatably placed being opposed to an image reading portion, the configuration around the image reading portion is complicated and upsized. On the other hand, in the image forming apparatus 10, as described below, the configuration around the second image reading portion 15 is simplified and downsized, and elimination of an influence of a foreign material adhering to the first reference member 16, etc., is realized.

Figure 3:
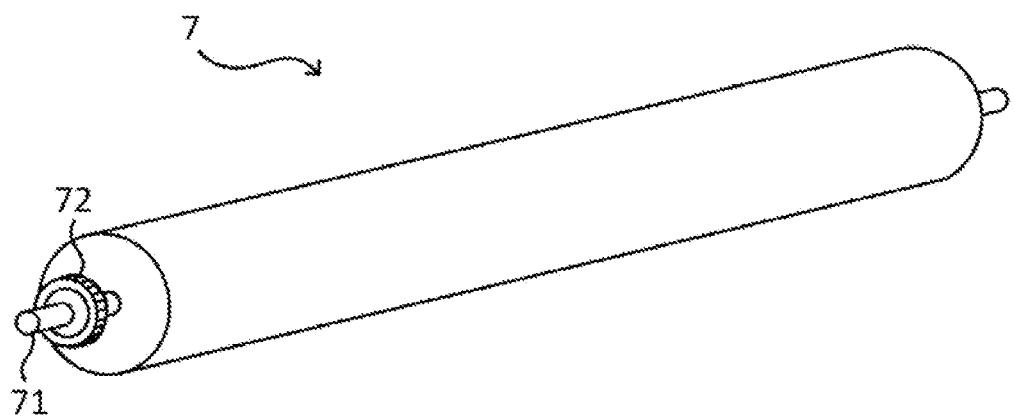
FIG. 3 is a diagram showing the configuration of a second reference member attached to an ADF of the image forming apparatus according to the embodiment of the present disclosure.
Figure 4:
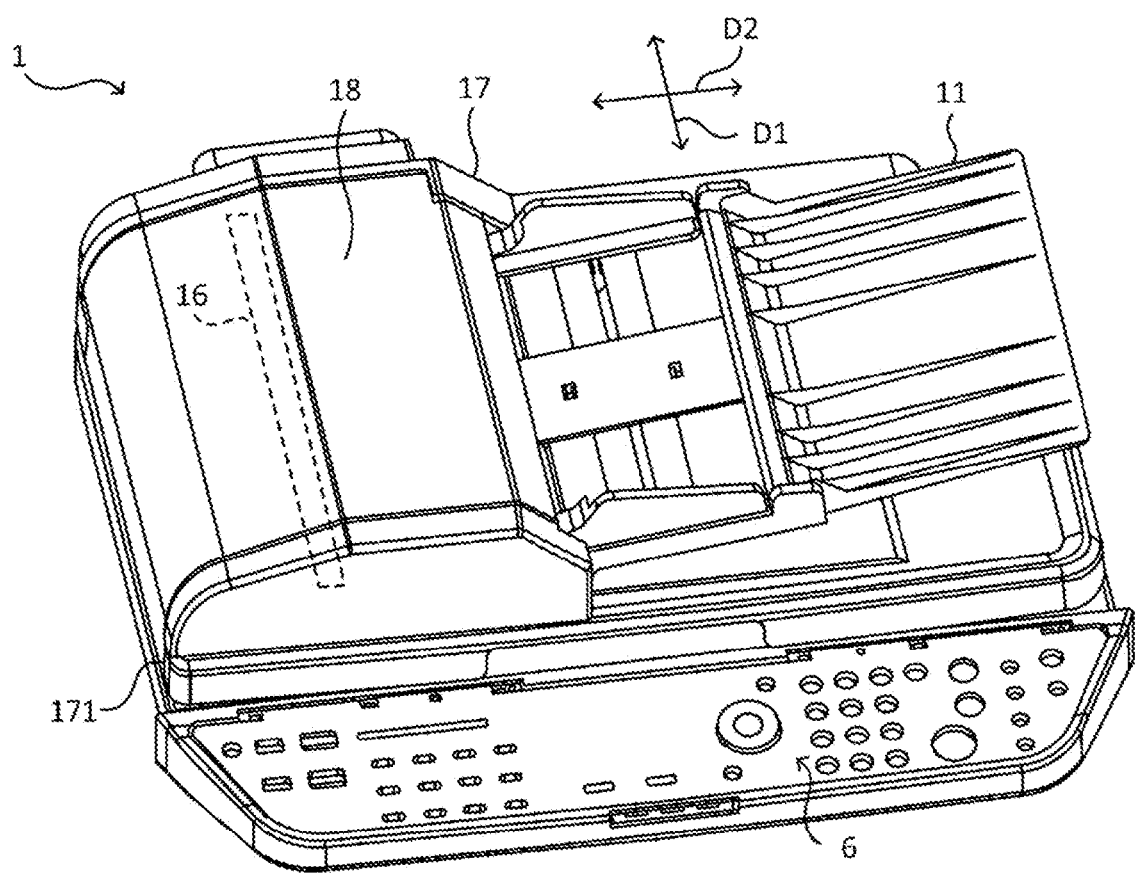
FIG. 4 is a diagram showing the ADF of the image forming apparatus according to the embodiment of the present disclosure, with a cover member of the ADF closed.
Figure 5:
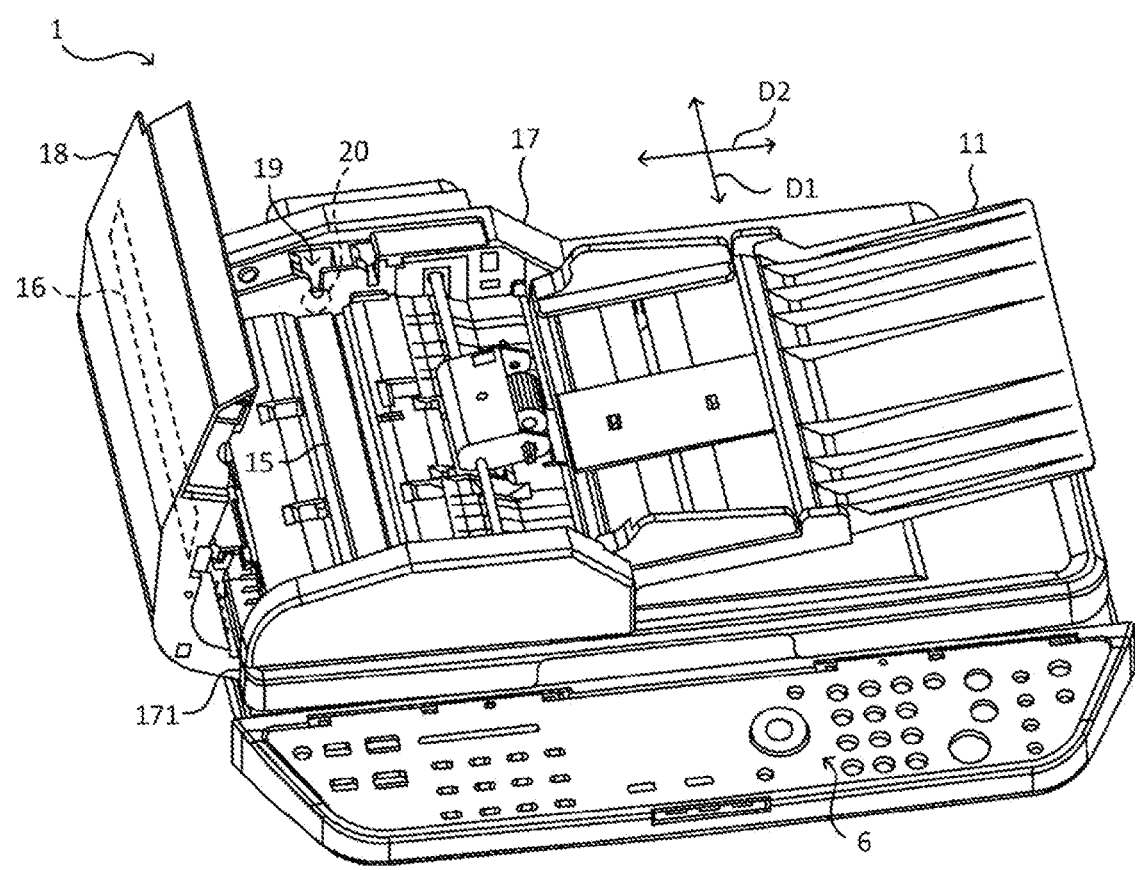
FIG. 5 is a diagram showing the ADF of the image forming apparatus according to the embodiment of the present disclosure, with the cover member of the ADF opened.
Figure 6:
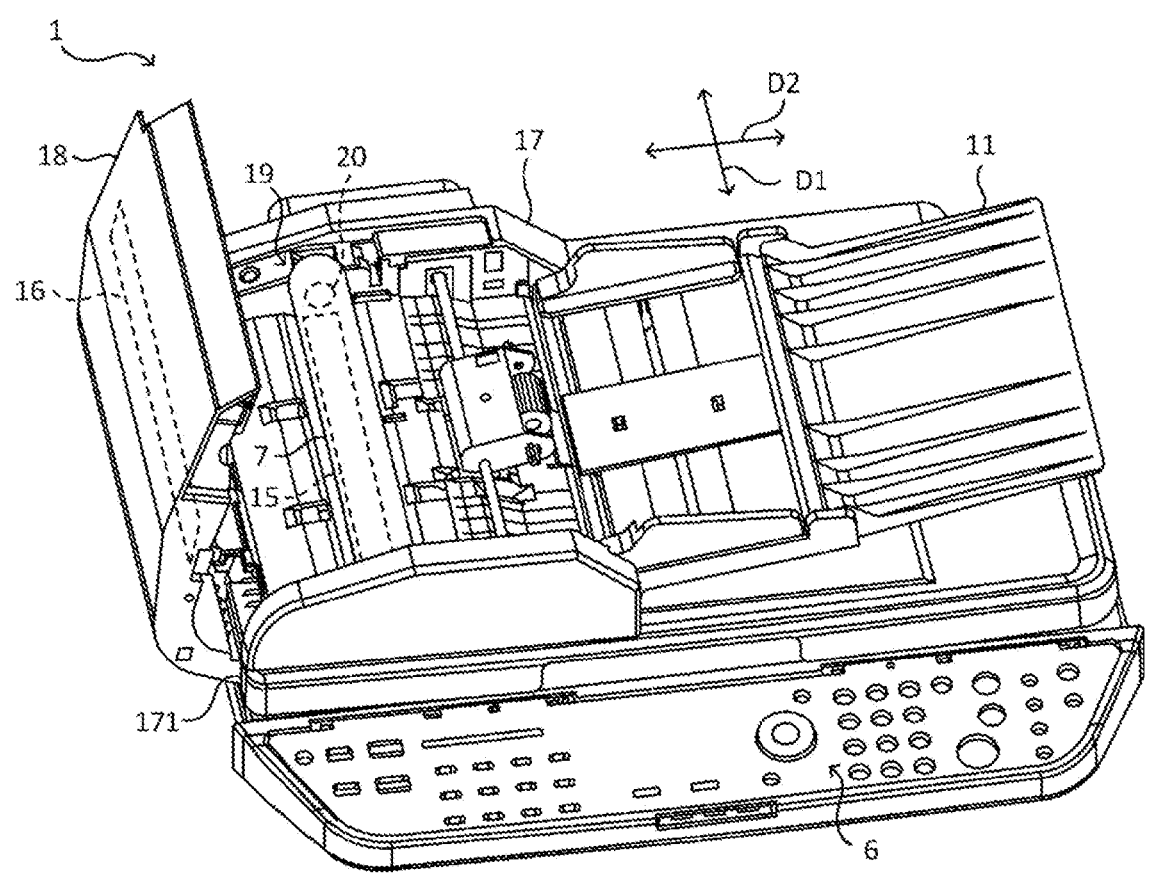
FIG. 6 is a diagram showing the ADF of the image forming apparatus according to the embodiment of the present disclosure, with the second reference member attached to the ADF.

Next, with reference to FIG. 3 to FIG. 6, a second reference member 7 attached to the ADF 1 will be described. Here, FIG. 3 is a perspective view of the second reference member 7. FIG. 4 to FIG. 6 are perspective views of the ADF 1.

The second reference member 7 is placed at a position opposed to the second image reading portion 15 such that the surface thereof having the reference color is movable in the sub scanning direction D2. Specifically, as shown in FIG. 3, the second reference member 7 is a roller member having a rotation surface having the reference color. The second reference member 7 has a rotational shaft 71 and a second gear 72 and is rotatably attached in the ADF 1.

As shown in FIG. 4 to FIG. 6, the ADF 1 further includes a unit housing 17, a cover member 18, a roller support portion 19, and a first gear 20.

The unit housing 17 is a housing accommodating members composing the ADF 1. The cover member 18 is a member covering an upper surface of the unit housing 17. As shown in FIG. 4 to FIG. 5, the cover member 18 is rotatably connected via a connection portion 171 provided at one end in the sub scanning direction D2 of the unit housing 17 so that the cover member 18 is openable and closable with respect to the unit housing 17.

Here, as shown in FIG. 5, the second image reading portion 15 is placed being fixed to the unit housing 17. On the other hand, the first reference member 16 is placed being fixed, on a surface of the cover member 18 facing the inside of the ADF 1, at a position opposed to the second image reading portion 15 when the cover member 18 is closed with respect to the unit housing 17. Therefore, in the image forming apparatus 10, as shown in FIG. 5, when the cover member 18 is opened, the first reference member 16 is retracted from the position opposed to the second image reading portion 15. Therefore, a worker such as a manufacturing person of a manufacturer can easily place the second reference member 7 at the position opposed to the second image reading portion 15, and does not need to perform work such as detaching a member such as the first reference member 16 in order to place the second reference member 7. Here, the cover member 18 and the connection portion 171 are an example of the retraction mechanism of the present disclosure.

As shown in FIG. 5, the roller support portion 19 is bearings provided on both sides in the main scanning direction D1 of the unit housing 17, at positions corresponding to the position where the second image reading portion 15 is placed. As shown in FIG. 6, the second reference member 7 is attached to the ADF 1 with the rotational shaft 71 inserted into the roller support portion 19, whereby the second reference member 7 is rotatably placed at the position opposed to the second image reading portion 15. Here, the roller support portion 19 is an example of the support portion of the present disclosure.

As shown in FIG. 5 and FIG. 6, the first gear 20 is provided at one end in the main scanning direction D1 of the unit housing 17 so as to be rotatable by the driving means as with the conveyance rollers 12. The second reference member 7 is attached with the second gear 72 engaged with the first gear 20, whereby the second reference member 7 is rotatable by a driving force transferred from the driving means. Thus, in the image forming apparatus 10, since the ADF 1 is provided with the roller support portion 19 and the first gear 20, the second reference member 7 can be rotatably attached at the position opposed to the second image reading portion 15. Therefore, it is not necessary to additionally provide a support device and a driving device for rotatably placing the second reference member 7 at the position opposed to the second image reading portion 15. Here, the first gear 20 is an example of the driving mechanism of the present disclosure.

As shown in FIG. 2, the control portion 5 includes a second reading control portion 51, an initial data acquisition portion 52, a first reading control portion 53, a reference data generation portion 54, and a shading correction portion 55.

Specifically, in the ROM or the EEPROM of the control portion 5, an initial data acquisition program and a reference data generation program for causing the CPU to execute an initial data acquisition process (see FIG. 7) and a reference data generation process (see FIG. 8) which are described later are stored in advance. The initial data acquisition program and the reference data generation program may be stored in a non-transitory computer-readable storage medium such as a CD, a DVD, or a flash memory, and may be read from the storage medium and installed on the storage portion such as the EEPROM of the control portion 5. The control portion 5 causes the CPU to execute the initial data acquisition program and the reference data generation program stored in the ROM or the like, thereby functioning as the second reading control portion 51, the initial data acquisition portion 52, the first reading control portion 53, the reference data generation portion 54, and the shading correction portion 55. In the case where the control portion 5 is an electronic circuit, the second reading control portion 51, the initial data acquisition portion 52, the first reading control portion 53, the reference data generation portion 54, and the shading correction portion 55 are configured as modules of the control portion 5.

The second reading control portion 51 reads image data for a plurality of lines from the second reference member 7 by using the second image reading portion 15, while the surface of the second reference member 7 is moving in the sub scanning direction D2 at the position opposed to the second image reading portion 15. Specifically, with the second reference member 7 attached to the ADF 1, the second reading control portion 51 controls the driving means to rotate the second reference member 7. Then, while the second reference member 7 is being rotated, the second reading control portion 51 causes the light source of the second image reading portion 15 to radiate lights of R, G, and B at the same time, thereby reading image data from the second reference member 7.

The initial data acquisition portion 52 generates initial reference data for one line based on the image data read by the second reading control portion 51, and stores the initial reference data in the EEPROM. For example, the initial data acquisition portion 52 calculates an average value at each pixel position in the main scanning direction D1 on the image data for the plurality of lines read by the second reading control portion 51, thereby generating the initial reference data for one line. Alternatively, a pixel having the lowest density may be detected at each pixel position in the main scanning direction D1, whereby the initial reference data for one line may be generated. Here, the EEPROM in which the initial reference data is stored is an example of the storage portion of the present disclosure.

Here, the initial data acquisition portion 52 may store only a high-frequency component contained in the generated initial reference data, in the EEPROM. For example, the initial data acquisition portion 52 averages every predetermined number of pixels of the initial reference data for one line, thereby acquiring a low-frequency component whose pixel density per unit length in the main scanning direction D1 is lower than that of the original initial reference data. Then, the acquired low-frequency component is subtracted from the original initial reference data, whereby a high-frequency component of the initial reference data can be acquired. A method for acquiring a low-frequency component and a high-frequency component of image data by the initial data acquisition portion 52 is not limited to the above one, but a conventional known method may be used.

The first reading control portion 53 reads image data for one line in the main scanning direction D1 by using the second image reading portion 15, from the first reference member 16 which has the reference color and is placed being opposed to the second image reading portion 15. Specifically, the first reading control portion 53 causes the light source to sequentially radiate lights of R, G, and B, thereby reading image data for one line for each color.

The reference data generation portion 54 generates reference data based on the image data read by the first reading control portion 53 and the high-frequency component of the initial reference data stored in the EEPROM. Specifically, the reference data generation portion 54 superimposes the high-frequency component of the initial reference data on a low-frequency component of the image data read by the first reading control portion 53, thereby generating the reference data. The reference data generation portion 54 generates the reference data for each color, based on each of the image data for the respective colors read by the first reading control portion 53 and the high-frequency component of the initial reference data stored in the EEPROM.

The shading correction portion 55 performs shading correction for image data read from a document by the second image reading portion 15, based on the reference data generated by the reference data generation portion 54. For example, the shading correction portion 55 performs the shading correction for each pixel of the read image data, based on Expression (1) shown below. A method of the shading correction by the shading correction portion 55 is not limited to the above one, but a conventional known method may be used.

Density value of corrected image data=Gradation number×(Density value of read image data−Density value of reference data)/(Density value of black level−Density value of reference data) (1)

[Initial Data Acquisition Process]

Figure 7:
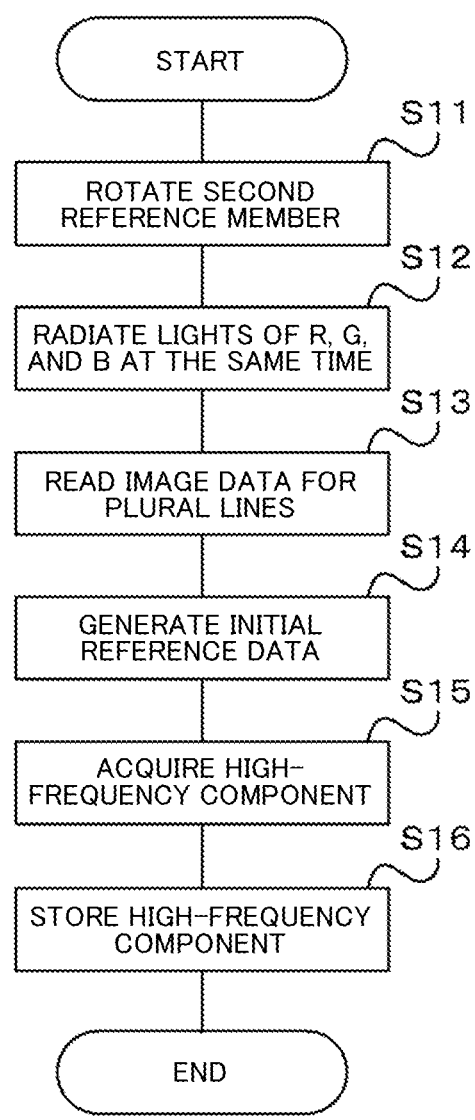
FIG. 7 is a flowchart showing an example of an initial data acquisition process executed by the image forming apparatus according to the embodiment of the present disclosure.

Hereinafter, with reference to FIG. 7, an example of procedure of the initial data acquisition process executed by the control portion 5 in accordance with the initial data acquisition program in the image forming apparatus 10 will be described. Here, steps S11, S12, . . . denote numbers of the process procedure (steps) executed by the control portion 5.

The initial data acquisition process is executed when a predetermined setting operation is performed on the operation display portion 6 in a state in which the second reference member 7 is attached to the ADF 1. For example, the initial data acquisition process is executed when the image forming apparatus 10 is manufactured or when maintenance of the image forming apparatus 10 is performed. Here, in the initial data acquisition process, reading of image data by the second image reading portion 15 is performed with the cover member 18 opened. Therefore, the initial data acquisition process may be executed in a state in which the second image reading portion 15 and the second reference member 7 are covered by an external cover member so that external light is blocked. Alternatively, the initial data acquisition process may be executed with the image forming apparatus 10 placed in a dark room.

<Step S11>

First, in step S11, the control portion 5 rotates the second reference member 7 attached to the ADF 1. Specifically, the control portion 5 controls the driving means to rotate the second reference member 7.

<Step S12>

In step S12, the control portion 5 causes the light source of the second image reading portion 15 to radiate color lights of R, G, and B at the same time to the second reference member 7 that is being rotated.

<Step S13>

In step S13, the control portion 5 reads image data for a plurality of lines from the second reference member 7, based on reflection light reflected by the second reference member 7 after radiated from the light source in step S12. Here, processing from step S11 to step S13 is executed by the second reading control portion 51 of the control portion 5.

<Step S14>

In step S14, the control portion 5 generates the initial reference data for one line, based on the image data for the plurality of lines read in step S13. Specifically, the control portion 5 calculates an average value at each pixel position in the main scanning direction D1 on the image data for the plurality of lines read in step S13, thereby generating the initial reference data for one line. Thus, influences of a concave or convex part of the rotation surface and a foreign material adhering to the rotation surface of the second reference member 7 on the initial reference data are reduced.

<Step S15>

In step S15, the control portion 5 acquires a high-frequency component contained in the initial reference data, based on the initial reference data generated in step S14. Specifically, the image data read from the second reference member 7 contains a low-frequency component in which light emission characteristics of the light source are reflected and a high-frequency component in which an influence of a foreign material adhering to the surface of the second reference member 7, etc., is reflected. However, in step S15, only the high-frequency component is extracted from the image data.

Specifically, the control portion 5 averages every predetermined number of pixels of the initial reference data for one line, thereby acquiring a low-frequency component whose pixel density per unit length in the main scanning direction D1 is lower than that of the original initial reference data. Then, the control portion 5 subtracts the acquired low-frequency component from the original initial reference data, thereby acquiring a high-frequency component of the initial reference data. For example, a high-frequency component having a data amount of 5 bits per pixel is acquired from the initial reference data having a data amount of 10 bits per pixel.

<Step S16>

In step S16, the control portion 5 stores, in the EEPROM, the high-frequency component of the initial reference data acquired in step S15. Here, processing from step S11 to step S16 is an example of the first step of the present disclosure. Processing from step S14 to step 16 is executed by the initial data acquisition portion 52 of the control portion 5.

Thus, in the initial data acquisition process, image data for a plurality of lines are read from the second reference member 7 attached to the ADF 1, and the initial reference data in which influences of a concave or convex part of the rotation surface and a foreign material adhering to the rotation surface of the second reference member 7 are reduced is acquired.

Here, in the initial data acquisition process, of the initial reference data, only a high-frequency component which is necessary for generation of the reference data in the reference data generation process described later is stored in the EEPROM. Therefore, as compared to the case where the entire initial reference data is stored in the EEPROM, a storage space needed for storing the initial reference data in the EEPROM is reduced.

In the initial data acquisition process, since it is not necessary to reflect, in the initial reference data, light emission characteristics of the light source for each color, which do not appear in a high-frequency component, lights of R, G, and B are radiated at the same time to acquire common initial reference data for these colors. Therefore, as compared to the case where the initial reference data is acquired for each color and stored in the EEPROM, a storage space needed for storing the initial reference data in the EEPROM is reduced.

The high-frequency component of the initial reference data acquired in the initial data acquisition process is used for generating the reference data in the reference data generation process described below.

[Reference Data Generation Process]

Figure 8:
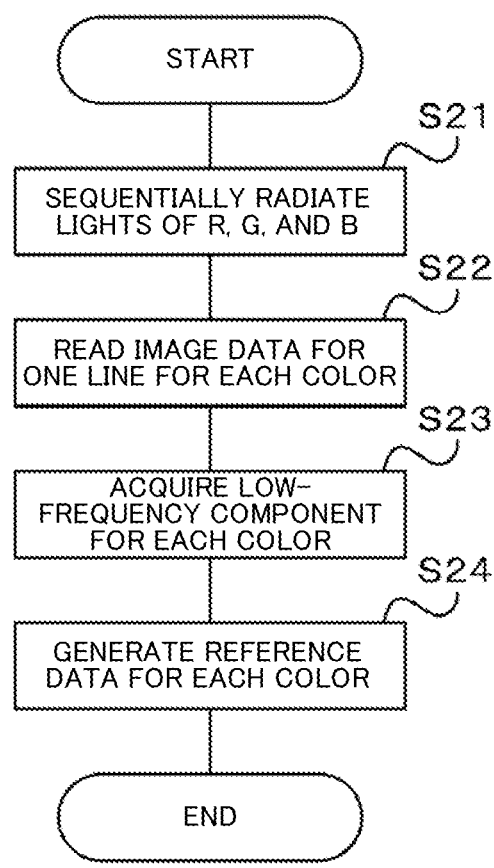
FIG. 8 is a flowchart showing an example of a reference data generation process executed by the image forming apparatus according to the embodiment of the present disclosure.

Next, with reference to FIG. 8, an example of procedure of the reference data generation process executed by the control portion 5 in accordance with the reference data generation program in the image forming apparatus 10 will be described. The reference data generation process is executed by the control portion 5 when the image forming apparatus 10 is powered on, when the image forming apparatus 10 returns from a power saving mode, when a predetermined specific period has elapsed, or when a predetermined specific number of sheets are printed, for example.

<Step S21>

First, in step S21, the control portion 5 causes the light source of the second image reading portion 15 to sequentially radiate each color light of R, G, and B to the first reference member 16 placed being opposed to the second image reading portion 15.

<Step S22>

In step S22, the control portion 5 reads image data for one line for each color, based on reflection light reflected by the first reference member 16 after radiated from the light source in step S21. Here, processing in step S21 and step S22 is an example of the second step of the present disclosure, and is executed by the first reading control portion 53 of the control portion 5.

<Step S23>

In step S23, the control portion 5 acquires a low-frequency component contained in each image data for one line for the respective colors acquired in step S22. A method for acquiring the low-frequency component is the same as in step S15 in the initial data acquisition process. Thus, only a low-frequency component in which aging of light emission characteristics of the light source from when the initial reference data has been acquired to when the reference data generation process is executed is reflected is extracted from the image data read by the first reference member 16.

<Step S24>

In step S24, the control portion 5 generates the reference data for each color, based on each of the low-frequency components of the image data for one line for the respective colors acquired in step S23, and the high-frequency component of the initial reference data stored in the EEPROM in step S16 in the initial data acquisition process. Specifically, the control portion 5 superimposes the high-frequency component of the initial reference data on each of the low-frequency components of the image data for one line for the respective colors, thereby generating the reference data for each color. Thus, the control portion 5 can acquire the reference data in which light emission characteristics of the light source at the time of the reference data generation process are reflected and an influence of a foreign material adhering to the first reference member 16 at the time of the reference data generation process, etc., is eliminated.

The control portion 5 stores the generated reference data for each color in the RAM or the EEPROM, and ends the reference data generation process. Here, processing in step S23 and step S24 is an example of the third step of the present disclosure, and is executed by the reference data generation portion 54 of the control portion 5.

Thereafter, the reference data for each color acquired in the reference data generation process is used for the shading correction for image data read from a document by using the second image reading portion 15. Specifically, when color image data is read from a document by using the second image reading portion 15, the control portion 5 executes the shading correction based on the reference data for each color stored in the RAM or the EEPROM. Here, execution of the shading correction by the control portion 5 is an example of the fourth step of the present disclosure, and is executed by the shading correction portion 55 of the control portion 5.

As described above, in the image forming apparatus 10, the second reference member 7 is attached only when the initial data acquisition process is executed, and the initial reference data in which an influence of a foreign material adhering to the second reference member 7, etc., is reduced is acquired. When the reference data generation process is executed, the reference data is generated using the initial reference data. Therefore, it is not necessary to provide the second reference member 7 inside the ADF 1 and the configuration of the ADF 1 can be simplified and downsized, while an influence of a foreign material adhering to the first reference member 16, etc., can be eliminated.

OTHER EMBODIMENTS

As another embodiment, a storage portion such as the EEPROM in which the initial reference data prepared in advance is stored may be incorporated into the image forming apparatus 10. In this case, in the image forming apparatus 10, components needed for acquiring the initial reference data, i.e., the second reading control portion 51, the initial data acquisition portion 52, the retraction mechanism realized by the cover member 18 and the connection portion 171, the roller support portion 19, and first gear 20, can be removed. Alternatively, the initial reference data prepared in advance may be stored in the storage portion that the image forming apparatus 10 has. Thus, the configuration of the image forming apparatus 10 can be simplified.

As another embodiment, in the image forming apparatus 10, the reference data generation portion 54 may generate the reference data, using a part or the entirety of the high-frequency component contained in the image data read by the first reading control portion 53.

Specifically, the reference data generation portion 54 may calculate a weighted average of the high-frequency component of the image data read by the first reading control portion 53 and the high-frequency component of the initial reference data in accordance with an adhesion condition of a foreign material on the first reference member 16, and may superimpose a result of the calculation on the low-frequency component of the image data read by the first reading control portion 53, thereby acquiring the reference data. For example, the reference data generation portion 54 may calculate the adhesion condition of a foreign material on the first reference member 16 by comparing the high-frequency component of the image data read by the first reading control portion 53 and the high-frequency component of the initial reference data.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. An image reading device comprising:
   an image reading portion configured to read image data from a document conveyed to pass through a predetermined reading position;
   a reading control portion configured to read the image data for one line in a main scanning direction from a first reference member placed being opposed to the image reading portion and having a predetermined reference color;
   a storage portion in which initial reference data for one line is stored, the initial reference data for one line being generated based on the image data for a plurality of lines read from a second reference member by using the image reading portion while a surface of the second reference member having the reference color is moving in a sub scanning direction perpendicular to the main scanning direction at a position opposed to the image reading portion;
   a reference data generation portion configured to generate reference data based on the image data read by the reading control portion and a high-frequency component of the initial reference data stored in the storage portion; and
   a shading correction portion configured to perform shading correction for the image data read from the document by the image reading portion, based on the reference data generated by the reference data generation portion.

2. The image reading device according to claim 1, wherein the initial reference data is data generated by the image data for a plurality of lines being averaged.

3. The image reading device according to claim 1, wherein the reference data generation portion superimposes a low-frequency component of the image data read by the reading control portion on a high-frequency component of the initial reference data, thereby generating the reference data.

4. The image reading device according to claim 1, wherein the storage portion stores only a high-frequency component of the initial reference data.

5. The image reading device according to claim 1, wherein the reading control portion is a first reading control portion, the image reading device further comprising:
   a second reading control portion configured to read the image data for a plurality of lines from the second reference member by using the image reading portion, while the surface of the second reference member is moving in the sub scanning direction at the position opposed to the image reading portion; and
   an initial data acquisition portion configured to generate the initial reference data for one line, based on the image data read by the second reading control portion, and store the initial reference data for one line in the storage portion.

6. The image reading device according to claim 5, further comprising a retraction mechanism configured to retract the first reference member from a position opposed to the image reading portion.

7. The image reading device according to claim 6, wherein the second reference member is a roller member, the image reading device further comprising:
 a support portion configured to rotatably support the second reference member; and
 a driving mechanism configured to rotate the second reference member supported by the support portion.

8. The image reading device according to claim 1, wherein
 the image reading portion includes a light source configured to radiate lights in a plurality of colors to the predetermined reading position,
 the reading control portion causes the light source to sequentially radiate the lights in the plurality of colors, thereby reading the image data for one line for each color,
 the storage portion stores the initial reference data for one line generated based on the image data read when the lights in the plurality of colors are radiated at the same time from the light source while the surface of the second reference member is moving in the sub scanning direction at the position opposed to the image reading portion, and
 the reference data generation portion generates the reference data for each color based on each of the image data for the respective colors read by the reading control portion and a high-frequency component of the initial reference data stored in the storage portion.

9. An image forming apparatus comprising:
 the image reading device according to claim 1; and
 an image forming portion configured to form an image based on image data read by the image reading device.

10. An image processing method to be executed by an image reading device that includes an image reading portion configured to read image data from a document conveyed to pass through a predetermined reading position, the image processing method comprising:
 a first step of storing, in a storage portion, initial reference data for one line generated based on the image data for a plurality of lines read from a second reference member by using the image reading portion while a surface of the second reference member having a predetermined reference color is moving in a sub scanning direction perpendicular to a main scanning direction at a position opposed to the image reading portion;
 a second step of reading the image data for one line in the main scanning direction from a first reference member placed being opposed to the image reading portion and having the reference color;
 a third step of generating reference data based on the image data read in the second step and a high-frequency component of the initial reference data stored in the storage portion in the first step; and
 a fourth step of performing shading correction for the image data read from the document by the image reading portion, based on the reference data generated in the third step.

* * * * *